United States Patent
Ito et al.

(10) Patent No.: US 10,474,738 B2
(45) Date of Patent: Nov. 12, 2019

(54) EDITING DEVICE, METHOD, AND COMPUTER-READABLE MEDIUM FOR ADJUSTING CHARACTER SIZES

(71) Applicant: BROTHER KOGYO KABUSHIKI KAISHA, Nagoya, Aichi (JP)

(72) Inventors: Naoto Ito, Aichi (JP); Junya Kawai, Kiyosu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/140,677

(22) Filed: Sep. 25, 2018

(65) Prior Publication Data

US 2019/0147018 A1    May 16, 2019

(30) Foreign Application Priority Data

Nov. 13, 2017  (JP) ................. 2017-218112

(51) Int. Cl.
| | |
|---|---|
| G06K 15/02 | (2006.01) |
| G06F 17/21 | (2006.01) |
| G06F 17/24 | (2006.01) |
| B41J 3/407 | (2006.01) |
| G06F 3/12 | (2006.01) |

(52) U.S. Cl.
CPC .......... G06F 17/214 (2013.01); B41J 3/4075 (2013.01); G06F 3/125 (2013.01); G06F 17/211 (2013.01); G06F 17/24 (2013.01)

(58) Field of Classification Search
None
See application file for complete search history.

(56) References Cited

U.S. PATENT DOCUMENTS

| | | | |
|---|---|---|---|
| 2004/0051893 A1* | 3/2004 | Yoshida ................. | G06K 15/02 358/1.11 |
| 2008/0014001 A1 | 1/2008 | Horii | |
| 2014/0247464 A1* | 9/2014 | Sugimoto ............ | G06K 15/002 358/1.15 |

FOREIGN PATENT DOCUMENTS

| | | |
|---|---|---|
| JP | H07182337 A | 7/1995 |
| JP | 2001344232 A | 12/2001 |
| JP | 2002190937 A | 7/2002 |
| JP | 2005267158 A | 9/2005 |
| JP | 2008021248 A | 1/2008 |

* cited by examiner

*Primary Examiner* — Henok Shiferaw
(74) *Attorney, Agent, or Firm* — Scully, Scott, Murphy & Presser, PC

(57) ABSTRACT

An editing device includes an adjuster configured to, with respect to a specific one of adjustment methods for each of blocks, determine a reduction rate at which a character size specified by setting size information associated with the specific adjustment method is reduced when the setting size information is changed to size information specifying a character size one-level smaller than the setting size information, among a plurality of pieces of size information associated with the specific adjustment method for each block in adjustment information, identify, as a reference reduction rate, a smallest one of the determined reduction rates for the character sizes each specified by the setting size information associated with the specific adjustment method for a corresponding block, and adjust the character size of one or more characters in each block with a specific reduction rate equal or approximated to the identified reference reduction rate.

18 Claims, 9 Drawing Sheets

FIG. 5A
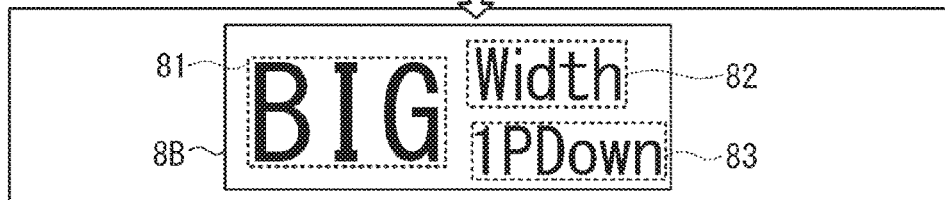
PRIOR ART
FIG. 5B
| ADJUSTMENT INFORMATION | | SETTING SIZE INFORMATION | | |
|---|---|---|---|---|
| ADJUSTMENT METHOD | SIZE INFORMATION | BIG | Width | 1PDown |
| WIDTH ADJUSTMENT | ×2 | | | |
| | ×3/2 | | | |
| | ×1 | | WIDTH: 66.7% HEIGHT: 100% | |
| | ×2/3 | | | |
| | ×1/2 | ← | | ← |
| BIG CHARACTER | ON | WIDTH: 80% HEIGHT: 80% | | |
| | OFF | ← | ← | ← |
| FONT SIZE | 64pt | ← | | |
| | 56pt | | | |
| | 50pt | | ← | WIDTH: 90% HEIGHT: 90% |
| | 45pt | | | ← |
| | : | | | |
| | : | | | |
| | 8pt | | | |
| | 6pt | | | |
PRIOR ART
FIG. 5C

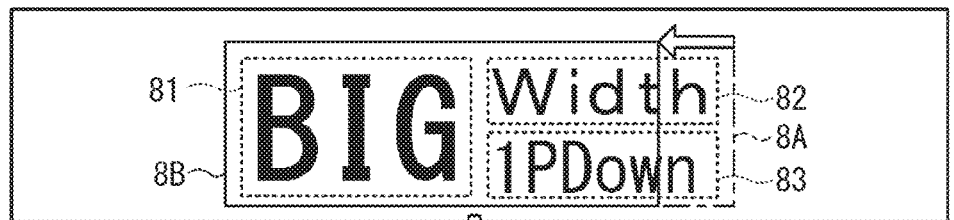
FIG. 6A
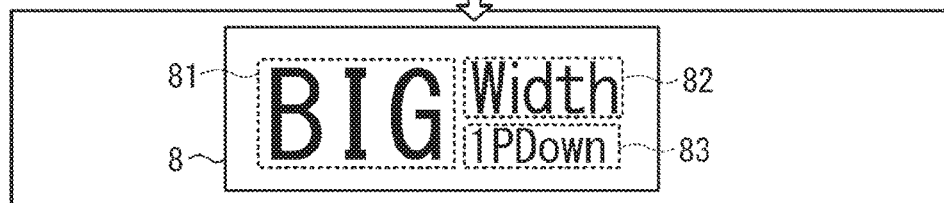
FIG. 6B
FIG. 6C

EDITING DEVICE, METHOD, AND COMPUTER-READABLE MEDIUM FOR ADJUSTING CHARACTER SIZES

CROSS-REFERENCE TO RELATED APPLICATION

This application claims priority under 35 U.S.C. § 119 from Japanese Patent Application No. 2017-218112 filed on Nov. 13, 2017. The entire subject matter of the application is incorporated herein by reference.

BACKGROUND

Technical Field

Aspects of the present disclosure are related to an editing device, a method, and a non-transitory computer-readable medium for adjusting character sizes.

Related Art

As editing devices to edit characters, for instance, devices (e.g., printers and PCs) configured to edit characters to be printed and devices (e.g., display devices) configured to edit characters to be displayed have been known. Further, a web content delivery server has been proposed as one of the known editing devices. The web content delivery server is configured to, in response to receiving a request for browsing web contents from a mobile information terminal, deliver the requested web contents to the mobile information terminal after adjusting character sizes of character information contained in the web contents in accordance with a small-size screen of the mobile information terminal. At this time, the web content delivery server may divide character strings contained in the character information into a plurality of segments, for each character type. Then, the web content delivery server may calculate a complexity of each segment of character strings. Further, the web content delivery server may calculate a character conversion magnification for each segment of character strings, depending on the calculated complexity. The web content delivery server may change a character size of each segment of character strings, based on the calculated character conversion magnification.

SUMMARY

In the web content delivery server, when the character conversion magnification differs depending on each segment of character strings, character strings having different character sizes are mixed in the character information. In such a case, the quality of appearance of the character information to be browsed might be degraded due to imbalance of a whole layout of the character strings contained in the character information.

Aspects of the present disclosure are advantageous to provide one or more improved techniques, for an editing device, which make it possible to change character sizes of characters while maintaining a balance of a whole layout of the characters.

According to aspects of the present disclosure, an editing device is provided, which includes a storage storing adjustment information including a plurality of pieces of size information associated with each of a plurality of adjustment methods for adjusting a character size of one or more characters disposed in each of a plurality of blocks, the plurality of pieces of size information specifying a plurality of gradually-varying character sizes settable for each block in each adjustment method, and setting size information set for each block in each adjustment method, the setting size information being size information specifying the character size set for each block, among the plurality of pieces of size information associated with each adjustment method, and an adjuster. The adjuster is configured to, with respect to a specific one of the adjustment methods for each block, determine a reduction rate at which the character size specified by the setting size information associated with the specific adjustment method is reduced when the setting size information is changed to size information specifying a character size one-level smaller than the setting size information, among the plurality of pieces of size information associated with the specific adjustment method for each block in the adjustment information, identify, as a reference reduction rate, a smallest one of the determined reduction rates for the character sizes each specified by the setting size information associated with the specific adjustment method for a corresponding one of the blocks, and adjust the character size of the one or more characters in each block with a specific reduction rate that is equal or approximated to the identified reference reduction rate.

According to aspects of the present disclosure, further provided is a method implementable on a processor coupled with an editing device. The editing device includes a storage storing adjustment information including a plurality of pieces of size information associated with each of a plurality of adjustment methods for adjusting a character size of one or more characters disposed in each of a plurality of blocks, the plurality of pieces of size information specifying a plurality of gradually-varying character sizes settable for each block in each adjustment method, and setting size information set for each block in each adjustment method, the setting size information being size information specifying the character size set for each block, among the plurality of pieces of size information associated with each adjustment method. The method includes, with respect to a specific one of the adjustment methods for each block, determining a reduction rate at which the character size specified by the setting size information associated with the specific adjustment method is reduced when the setting size information is changed to size information specifying a character size one-level smaller than the setting size information, among the plurality of pieces of size information associated with the specific adjustment method for each block in the adjustment information, identifying, as a reference reduction rate, a smallest one of the determined reduction rates for the character sizes each specified by the setting size information associated with the specific adjustment method for a corresponding one of the blocks, and adjusting the character size of the one or more characters in each block with a specific reduction rate that is equal or approximated to the identified reference reduction rate.

According to aspects of the present disclosure, further provided is a non-transitory computer-readable medium storing computer-readable instructions that are executable by a processor coupled with an editing device. The editing device includes a storage storing adjustment information including a plurality of pieces of size information associated with each of a plurality of adjustment methods for adjusting a character size of one or more characters disposed in each of a plurality of blocks, the plurality of pieces of size information specifying a plurality of gradually-varying character sizes settable for each block in each adjustment method, and setting size information set for each block in each adjustment method, the setting size information being size information specifying the character size set for each block, among the plurality of pieces of size information associated with each adjustment method. The instructions are configured to, when executed by the processor, cause the processor to, with respect to a specific one of the adjustment methods for each block, determine a reduction rate at which the character size specified by the setting size information associated with the specific adjustment method is reduced when the setting size information is changed to size information specifying a character size one-level smaller than the setting size information, among the plurality of pieces of size information associated with the specific adjustment method for each block in the adjustment information, identify, as a reference reduction rate, a smallest one of the determined reduction rates for the character sizes each specified by the setting size information associated with the specific adjustment method for a corresponding one of the blocks, and adjust the character size of the one or more characters in each block with a specific reduction rate that is equal or approximated to the identified reference reduction rate.

BRIEF DESCRIPTION OF THE ACCOMPANYING DRAWINGS

Figures 3A, 3B:
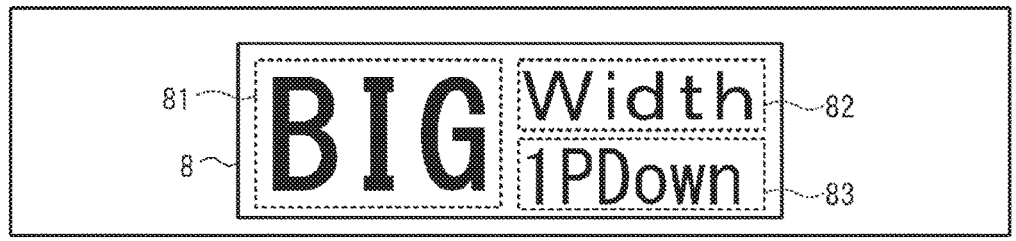

FIG. 3A exemplifies a layout of character strings to be printed each of which is in a corresponding one of separate blocks disposed within a particular area, in the illustrative embodiment according to one or more aspects of the present disclosure.

FIG. 3B exemplifies adjustment information and setting size information for adjusting respective character sizes of the character strings exemplified in FIG. 3A, in the illustrative embodiment according to one or more aspects of the present disclosure.

Figure 4A:
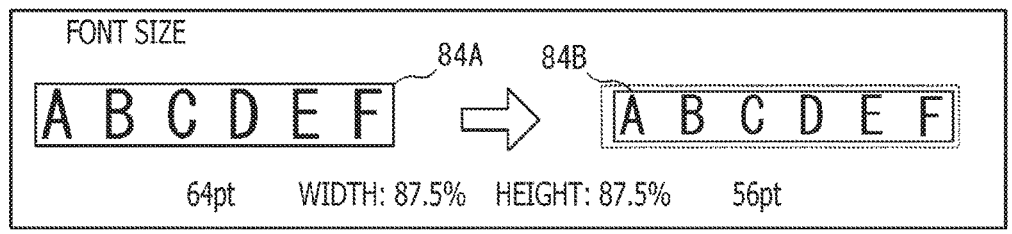
Figure 4B:
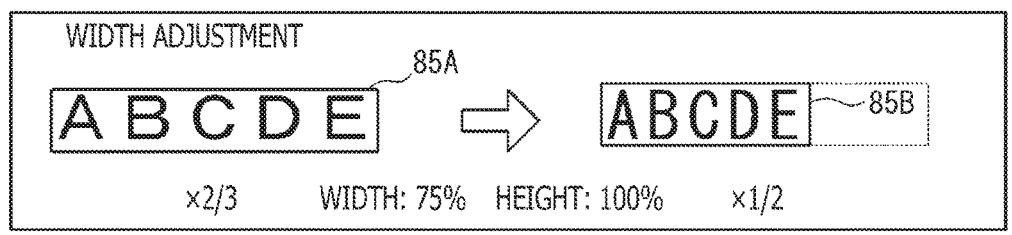
Figure 4C:
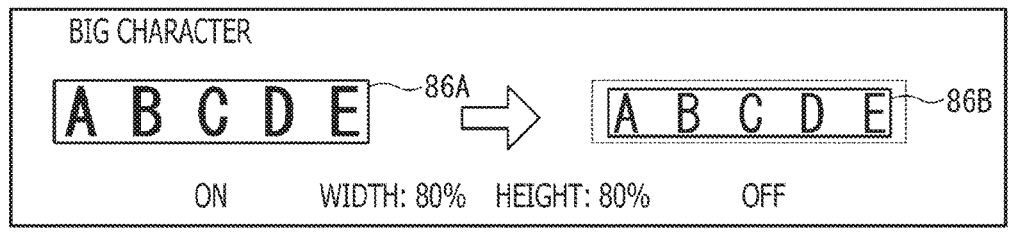

FIGS. 4A, 4B, 4C are illustrations for explaining adjustment methods "Width Adjustment," "Big Character," and "Font Size" for adjusting character sizes of example character strings, respectively, in the illustrative embodiment according to one or more aspects of the present disclosure.

FIG. 5A shows the layout of the character strings each of which is in a corresponding one of the separate blocks disposed within the particular area, in the illustrative embodiment according to one or more aspects of the present disclosure.

FIG. 5B shows a heretofore-applied method for reducing the respective character sizes of the character strings when the particular area is reduced in size in a width direction.

FIG. 5C shows adjustment information and setting size information for reducing the respective character sizes of the character strings in the heretofore-applied method when the particular area is reduced in size in the width direction.

FIG. 6A shows the layout of the character strings each of which is in a corresponding one of the separate blocks disposed within the particular area, in the illustrative embodiment according to one or more aspects of the present disclosure.

FIG. 6B shows a new method for reducing the respective character sizes of the character strings when the particular area is reduced in size in the width direction, in the illustrative embodiment according to one or more aspects of the present disclosure.

FIG. 6C shows adjustment information and setting size information for reducing the respective character sizes of the character strings in the new method when the particular area is reduced in size in the width direction, in the illustrative embodiment according to one or more aspects of the present disclosure.

Figure 7:
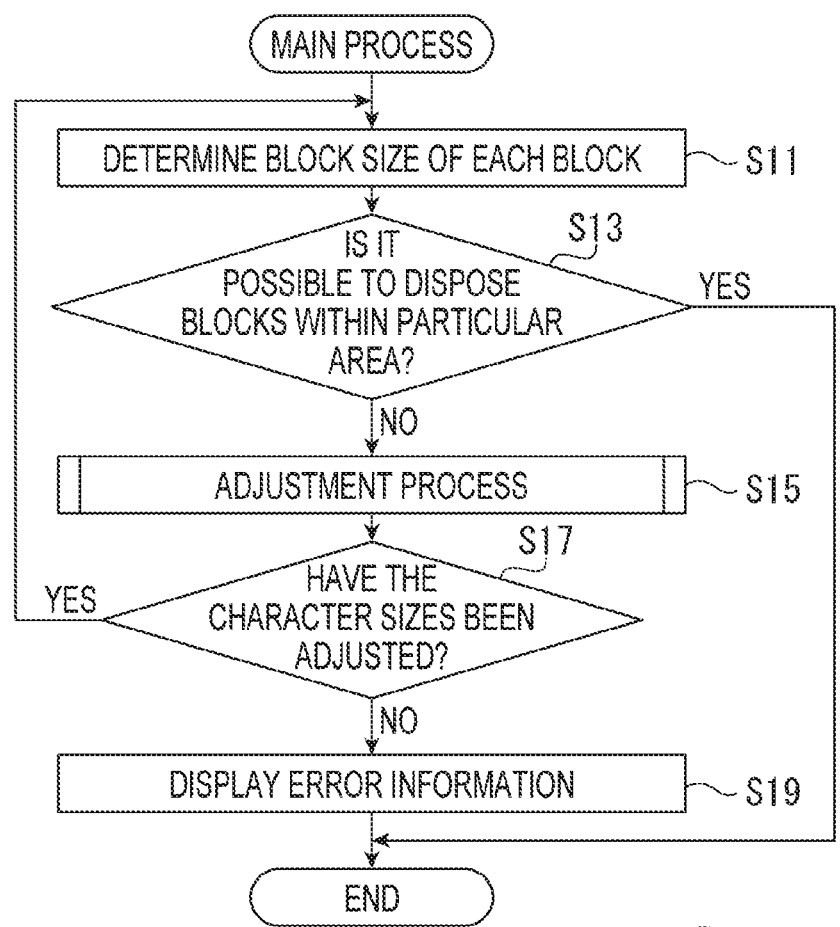

FIG. 7 is a flowchart showing a procedure of a main process in the illustrative embodiment according to one or more aspects of the present disclosure.

Figure 8:
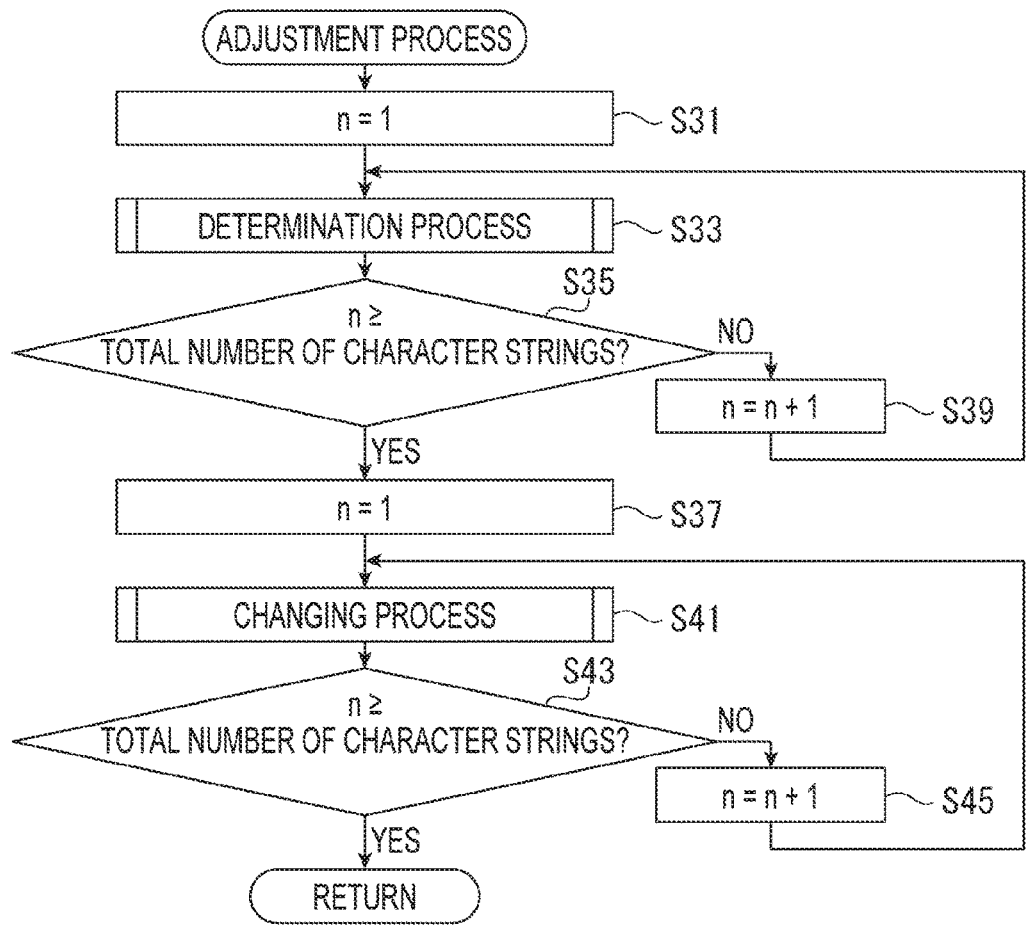

FIG. 8 is a flowchart showing a procedure of an adjustment process in the illustrative embodiment according to one or more aspects of the present disclosure.

Figure 9:
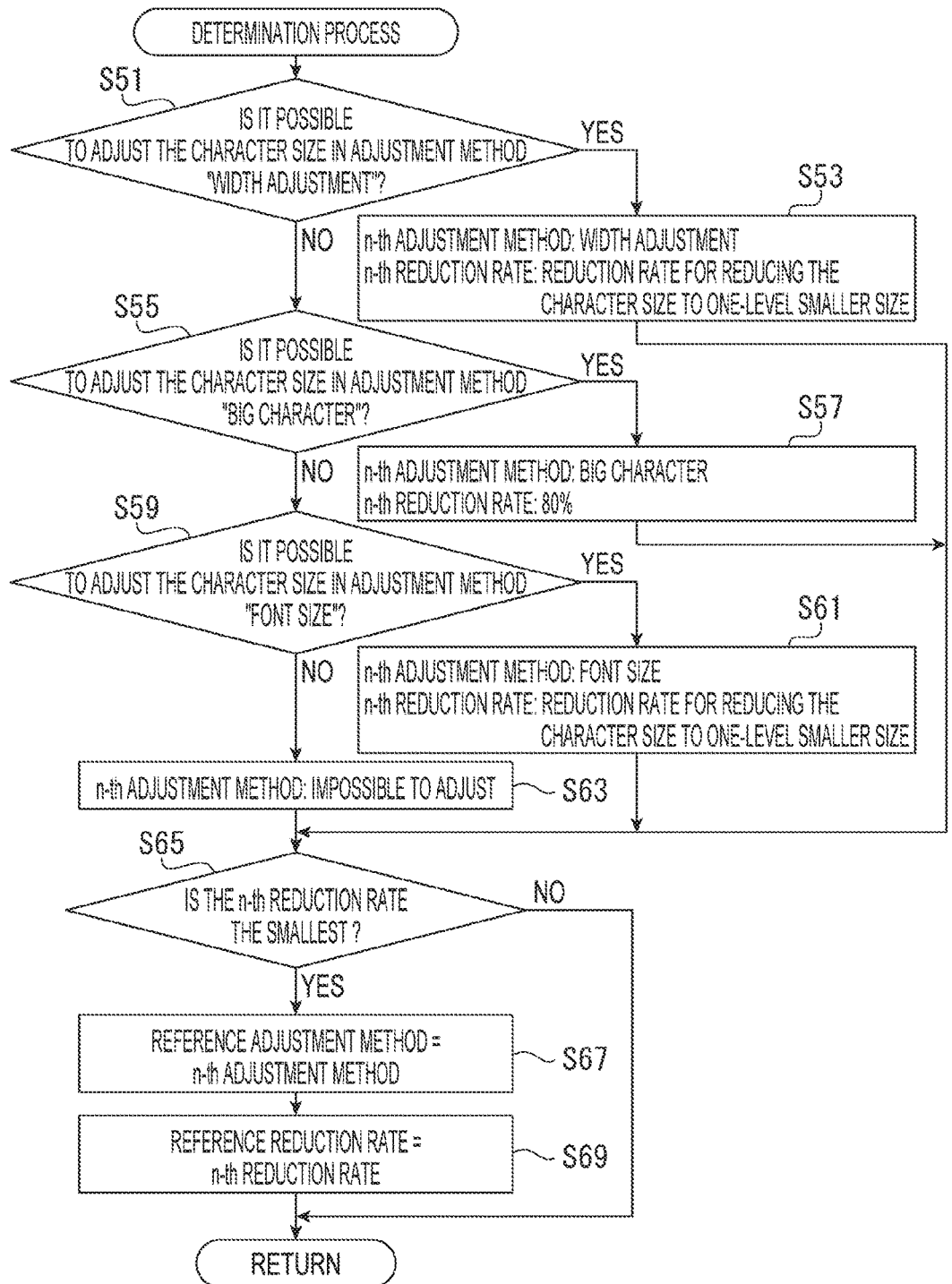

FIG. 9 is a flowchart showing a procedure of a determination process in the illustrative embodiment according to one or more aspects of the present disclosure.

Figure 10:
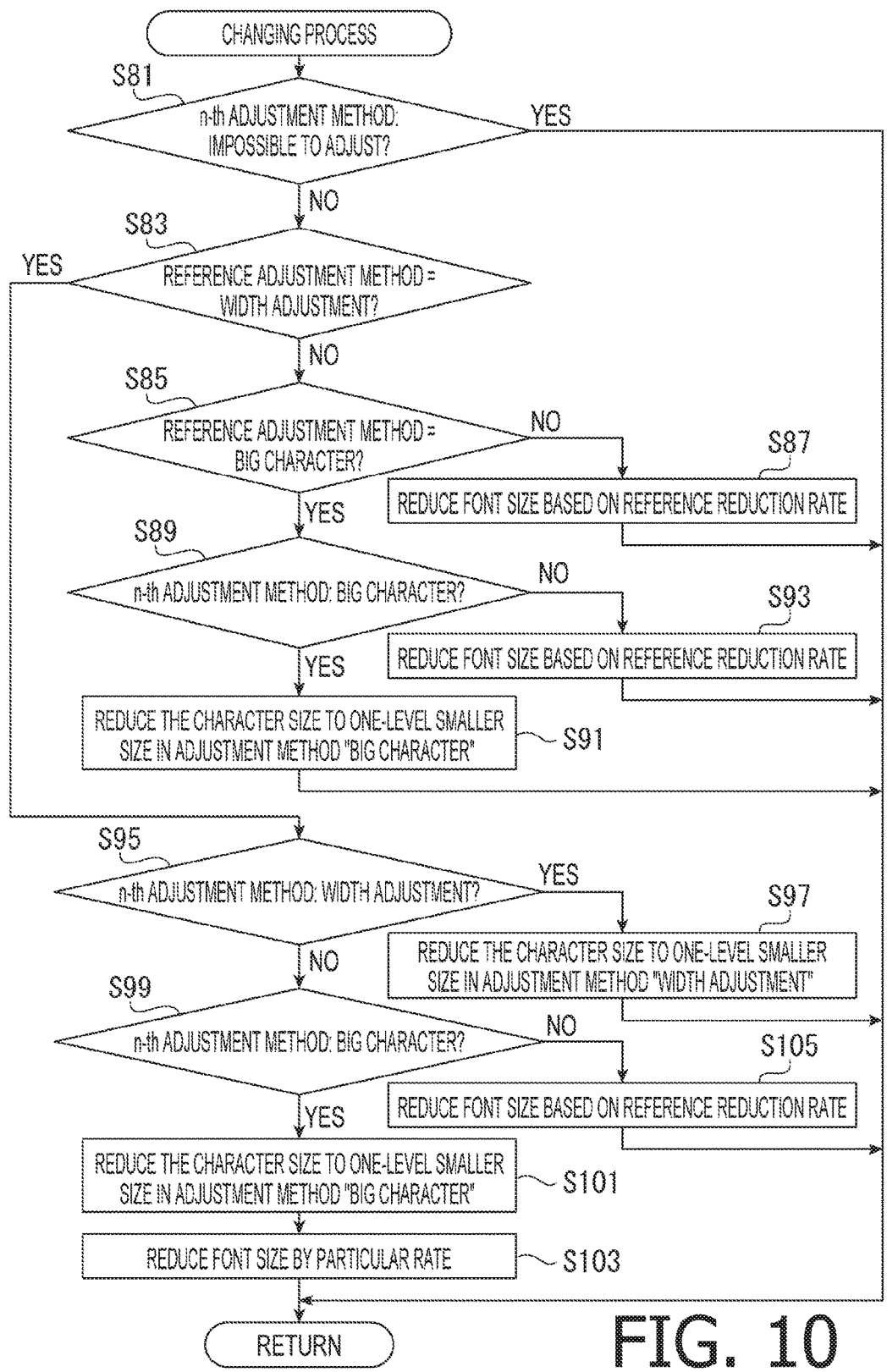

FIG. 10 is a flowchart showing a procedure of a changing process in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<General Overview of Printer>

Hereinafter, an illustrative embodiment according to aspects of the present disclosure will be described with reference to the accompanying drawings. A printer 1 is configured to produce a label by printing, on a tape as a print medium, print information such as characters, character strings, symbols, numerals, figures, and pictographic scripts. In the following description, as shown in FIG. 1, an upper left side, a lower right side, an upper right side, an upper side, and a lower side of the figure will be defined as a left side, a right side, an upside, a downside, a front side and a rear side of the printer 1.

Figure 1:
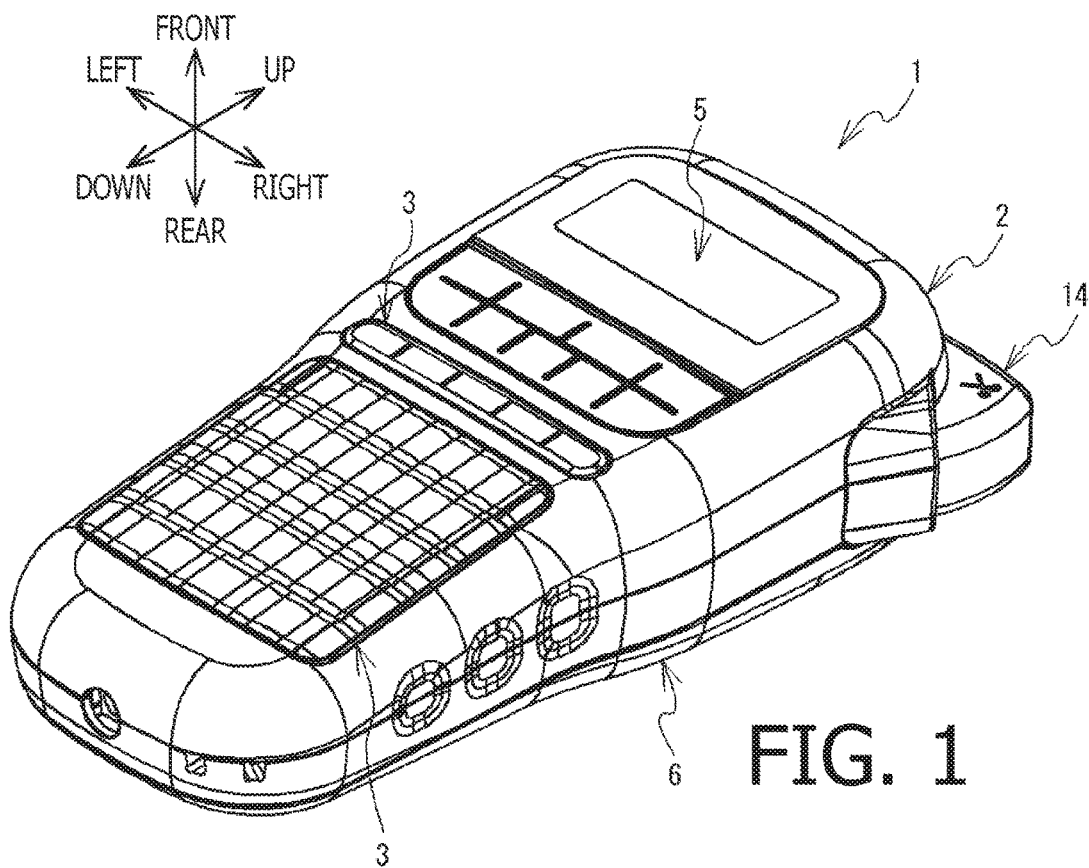
FIG. 1 is a perspective view of a printer in an illustrative embodiment according to one or more aspects of the present disclosure.

As shown in FIG. 1, the printer 1 includes a main body cover 2 that is a rectangular parallelepiped housing. A keyboard 3 for inputting characters is disposed at a lower section of a front face of the main body cover 2. The keyboard 3 includes alphabet keys, numeric keys, a power switch, usage purpose keys, and cursor keys. A display 5 for displaying various kinds of information is disposed an upper section of the front face of the main body cover 2. For instance, the display 5 may be a dot matrix LCD. On the back of the display 5, a cassette cover 6 is disposed. The cassette cover 6 is openable and closable relative to the main body cover 2. In an upper face of the main body cover 2, a discharge port is disposed. A printed tape is discharged out of the main body cover 2 via the discharge port. An operable member 14 is disposed at an upper right corner of the main body cover 2. When the operable member 14 is pressed inward, a cut motor 28A (see FIG. 2) is driven to cut the printed tape.

\<Electrical Configuration of Printer\>

Figure 2:
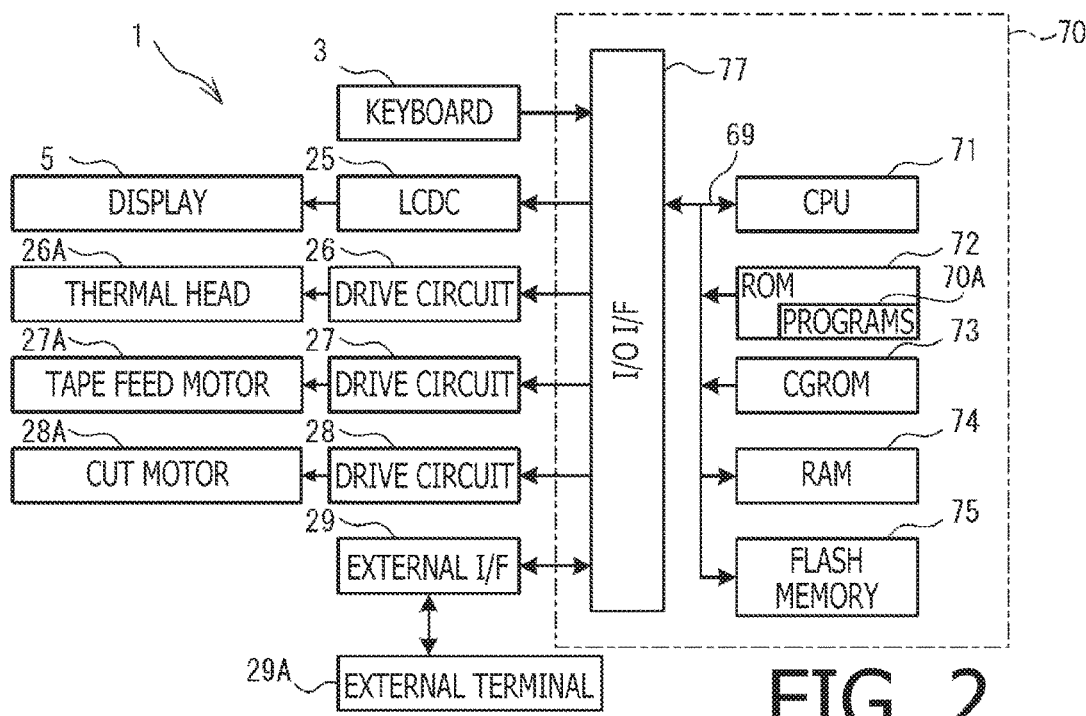
FIG. 2 is a block diagram schematically showing an electrical configuration of the printer in the illustrative embodiment according to one or more aspects of the present disclosure.

An electrical configuration of the printer 1 will be described with reference to FIG. 2. The printer 1 includes a controller 70. The controller 70 includes a CPU 71, a ROM 72, a CGROM 73, a RAM 74, a flash memory 75, and an input/output interface (hereinafter referred to as an "I/O I/F") 77. These elements included in the controller 70 are interconnected via a data bus 69. The CPU 71 is configured to comprehensively control the printer 1. The ROM 72 stores programs 70A and various kinds of parameters necessary for the CPU 71 to execute the programs 70A. Nonetheless, the flash memory 75 may store the programs 70A to be executed by the CPU 71. The CGROM 73 stores built-in fonts. The RAM 74 has a plurality of storage areas such as a text memory and a print buffer.

The I/O I/F 77 is connected with the keyboard 3, a liquid crystal drive circuit (hereinafter referred to as an "LCDC") 25, drive circuits 26, 27, and 28, and an external interface (hereinafter referred to as an "external I/F") 29. The LCDC 25 includes a video RAM (not shown) configured to transmit display data to the display 5. The drive circuit 26 is an electronic circuit configured to drive a thermal head 26A. The drive circuit 27 is an electronic circuit configured to drive a tape feed motor 27A. The drive circuit 28 is an electronic circuit configured to drive a cut motor 28A. The external I/F 29 may be communicably connected with an external terminal 29A. For instance, the CPU 71 may receive programs from the external terminal 29A via the external I/F 29 and store the received programs into the flash memory 75. Thereby, programs (e.g., the programs 70A) previously stored in the flash memory 75 may be updated with the received programs. The external terminal 29A may be a general-purpose personal computer or a mobile terminal.

\<Layout Printing Function of Printer\>

A layout printing function, which is one of functions of the printer 1, will be described below. The layout printing function is a function to print a plurality of character strings to be placed at respective different locations within a particular area, on a tape. Hereinafter, a specific region of each character string placed at a location, different from a location of any other character string, within a particular area may be referred to as a "block." For instance, in an example shown in FIG. 3A, three blocks 81, 82, and 83 are disposed within a particular area 8. The block 81, in which a character string "BIG" is placed, is disposed in a left half portion of the particular area 8. The block 82, in which a character string "Width" is placed, is disposed in an upper half section of a right half portion of the particular area 8. The block 83, in which a character string "1PDown" is placed, is disposed in a lower half section of the right half portion of the particular area 8. A size of the particular area 8 may be set by an input operation via the keyboard 3. In addition, each character string disposed within the particular area 8 may be set by an input operation via the keyboard 3. Further, a character size of the characters included in each character string may be set by an input operation via the keyboard 3. Moreover, a location of each character string (i.e., a location of each of the blocks 81 to 83) within the particular area 8 may be set by an input operation via the keyboard 3.

For instance, a user may specify the size of the particular area 8 and then input, via the keyboard 8, each of the character strings "BIG," "Width," and "1PDown" to be disposed within the particular area 8. At this time, the user may press a line feed button to separate the character strings from each other by line feeds, thereby separating the character strings on a block-by-block basis. Subsequently, the user may input a character size for each character string by setting below-mentioned three adjustment methods, i.e., "Width Adjustment," "Big Character," and "Font Size." Further, the user may input respective locations of the blocks 81 to 83. Furthermore, the user may input an instruction to perform layout printing. In this case, the CPU 71 of the printer 1 drives the drive circuit 27 to rotate the tape feed motor 27A, thereby conveying a tape and an ink ribbon. At the same time, the CPU 71 drives the drive circuit 26 to heat the thermal head 26A. When the thermal head 26A is heated, ink is transferred from the ink ribbon onto the tape. Thus, the character strings "BIG," "Width," "1PDown" to be disposed within the particular area 8 are printed in respective specified positions on the tape.

\<Adjustment Information and Setting Size Information\>

The character size is determined for each block, based on below-mentioned adjustment information 75A and setting size information 75B (see FIG. 3B) stored in the flash memory 75. It is noted that information for specifying the size of the particular area 8 and the locations of the blocks 81 to 83 is stored in the flash memory 75. The CPU 71 performs the layout printing function with reference to these kinds of information.

As shown in FIG. 3B, the adjustment information 75A defines three adjustment methods (i.e., "Width Adjustment," "Big Character," and "Font Size") as methods for adjusting the character size. Further, each adjustment method is associated with a plurality of pieces of size information specifying a plurality of gradually-varying settable character sizes. For each of the blocks 81 to 83, the character size is specified by selecting one of the plurality of pieces of size information associated with each adjustment method. Further, the setting size information represents size information selected to specify a character size from among the plurality of pieces of size information associated with each adjustment method. The setting size information is determined in accordance with a user's operation to input a character size in an initial state where a below-mentioned character size adjusting process has not been performed. In FIG. 3B, each piece of the setting size information 75B is specified by a corresponding leftward arrow and associated with a specific piece of size information pointed by the corresponding leftward arrow. Hereinafter, a relationship between the adjustment methods and the setting size information may be referred to as "the adjustment methods/the setting size information."

The adjustment method "Font Size" is a method for adjusting the character size by adjusting a Font Size for target characters. The method "Font Size" has a plurality of settable Font Sizes (e.g., 64 pt, 56 pt, 50 pt, 45 pt, . . . 8 pt, and 6 pt) as the plurality of pieces of size information therefor. The plurality of pieces of size information associated with the method "Font Size" gradually vary from one piece to a next piece of size information by an arbitrary varying value (e.g., 8 pt, 6 pt, 5 pt, . . . ) but do not gradually vary at regular intervals of a single point.

In an example shown in FIG. 3B, respective pieces of setting size information associated with the blocks 81 to 83 for the method "Font Size" are "64 pt" for "BIG," "50 pt" for "Width," and "50 pt" for "1PDown." Hence, the character string "BIG" in the block 81 is shown in a character size adjusted with a Font Size of 64 pt. The character string "Width" in the block 82 is shown in a character size adjusted with a Font Size of 50. The character string "1PDown" in the block 83 is shown in a character size adjusted with a Font Size of 50 pt.

Further, as exemplified in FIG. 4A, when setting size information (i.e., "64 pt") for a character string "ABCDEF" in the adjustment method "Font Size" is changed to "56 pt" which is size information specifying a character size one-level smaller than "64 pt," the character size of the character string "ABCDEF" is reduced by 12.5% in each of a horizontal direction (i.e., a width direction) and a vertical direction (i.e., a height direction). In this case, a reduction rate for the character size of the character string "ABCDEF" in each of the width direction and the height direction is determined to be "87.5%" from the following equation.

$$100(\%) - 12.5(\%) = 87.5(\%)$$

In this case, a reduction rate of a size of a block 84B after the character size of the character string "ABCDEF" has been reduced, to a size of a block 84A before the character size of the character string "ABCDEF" is reduced, is "87.5%" in each of the width direction and the height direction. In the following description, a size of each individual block may be referred to as a "block size." The "block size" corresponds to a size of a minimum rectangular frame surrounding a character string.

As shown in FIG. 3B, the adjustment method "Width Adjustment" is a method for adjusting the character size by adjusting a length of target characters in the width direction. The method "Width Adjustment" has a plurality of settable magnifications (e.g., "×2," "×3/2," "×1," "×⅔," and "×½") as the plurality of pieces of size information therefor. In the method "Width Adjustment," the character size of characters is calculated by multiplying a length, in the width direction, of the characters having setting size information (i.e., a Font Size) specified based on the method "Font Size" by a specific one of the plurality of pieces of size information associated with the method "Width Adjustment." The plurality of pieces of size information associated with the method "Width Adjustment" range from "×2" to "×½," as gradually varying from one piece to a next piece of size information by a rate of ¼ (25%) or ⅓ (33.3%).

In the example shown in FIG. 3B, respective pieces of setting size information associated with the blocks 81 to 83 for the method "Width Adjustment" are "×½" for "BIG," "×1" for "Width," and "×½" for "1PDown." Hence, the character string "BIG" in the block 81 is shown in a character size adjusted with a magnification of "×½.". The character string "Width" in the block 82 is shown in a character size adjusted with a magnification of "×1." The character string "1PDown" in the block 83 is shown in a character size adjusted with a magnification of "×½." Therefore, in the width direction, a length of the character string "Width" is longer than a length of the character string "1PDown" having the same Font Size as the character string "Width."

Further, as exemplified in FIG. 4B, when setting size information (i.e., "×⅔") for a character string "ABCDEF" having a character size adjusted based on a magnification of "×⅔" is changed to "×½" which is size information specifying a character size one-level smaller than "×⅔," the character size of the character string "ABCDEF" is reduced by 25% in the width direction. In this case, a reduction rate for the character size of the character string "ABCDEF" in the width direction is determined to be "75%" from the following equation.

$$100(\%) - 25(\%) = 75(\%)$$

It is noted that the character size of the character string "ABCDEF" is not reduced in the height direction. In this case, a reduction rate of a block size of a block 85B after the character size of the character string "ABCDEF" has been reduced, to a block size of a block 85A before the character size of the character string "ABCDEF" is reduced, is "75%" in the width direction. Namely, in this case, the block size for the character string "ABCDEF" is reduced in the width direction but does not change in the height direction.

As shown in FIG. 3B, the adjustment method "Big Character" is a method for enlarging the character size by lowering a baseline when a target character string is formed only by characters (hereinafter referred to as "big-target characters") entirely disposed higher than an initial level of the baseline. The baseline is a reference line for defining a position of a character in the vertical direction (i.e., the height direction). Namely, the method "Big Character" is a method for adjusting a width and a height of target characters such that the target characters occupy a range including an area lower than the baseline. When the method "Big Character" is applied, the character size is enlarged by 20% in each of the width direction and the height direction.

Specifically, for instance, capital letters "ABCDEFGHIKLMNOPRSTUVWXYZ" and small letters "abcdefhiklmnorstuvwxz" are characters each entirely disposed higher than the baseline, and therefore are regarded as big-target characters. Meanwhile, capital letters "JQ" and small letters "gjpqy" are characters each having a portion disposed lower than the baseline, and therefore are not regarded as big-target characters.

The adjustment method "Big Character" has two settable values (i.e., "ON" and "OFF") as the plurality of pieces of size information therefor. For instance, when a character size of a character string including only big-target characters is adjusted based on the value "ON" for the method "Big Character," the adjusted character size is 20% larger in each of the width direction and the height direction than when the character size is adjusted based on the value "NO" for the method "Big Character."

In the example shown in FIG. 3B, respective pieces of setting size information associated with the blocks 81 to 83 for the method "Big Character" are "ON" for "BIG," "OFF" for "Width," and "OFF" for "1PDown." Hence, the character size of the character string "BIG" is 20% larger in each of the width direction and the height direction than a character size of a character string having the same Font Size (i.e., 64 pt).

Further, as exemplified in FIG. 4C, when setting size information "ON" for a character string "ABCDEF" having a character size adjusted based on the setting size information "ON" in the adjustment method "Big Character" is changed to "OFF" which is size information specifying a character size one-level smaller than "ON," the character size of the character string "ABCDEF" is reduced by 20% in each of the width direction and the height direction. In this case, a reduction rate for the character size of the character string "ABCDEF" in each of the width direction and the height direction is determined to be "80%" from the following equation.

$$100(\%) - 20(\%) = 80(\%)$$

In this case, a reduction rate of a block size of a block 86B after the character size of the character string "ABCDEF" has been reduced, to a block size of a block 86A before the character size of the character string "ABCDEF" is reduced, is "80%" in each of the width direction and the height direction. Namely, the block size for the character string "ABCDEF" is reduced in each of the width direction and the height direction.

The three adjustment methods "Width Adjustment," "Big Character," and "Font Size" defined in the adjustment information 75A have previously-set priorities, respectively. Specifically, the method "Width Adjustment" has a priority higher than a priority set for the method "Big Character." Further, the priority set for the method "Big Character" is higher than a priority set for the method "Font Size." An explanation of how the priorities set for the three adjustment methods are used will be provided later.

<Heretofore-Applied Method for Reducing Character Size when Particular Area is Changed>

A case will be exemplified in which the user performs an operation to reduce a size of a once-set particular area 8 in the width direction. In this case, the printer 1 needs to reduce the character size of the character string in each of the blocks 81 to 83 to reduce the block size of each of the blocks 81 to 83 in the width direction, in such a manner as to fit the blocks 81 to 83 within the particular area 8 reduced in size in the width direction. Hereinafter, a heretofore-applied method for reducing the character size in the above-exemplified case will be described with reference to FIGS. 5A, 5B, and 5C.

As shown in FIG. 5A, when a user operation is performed to convert a particular area 8A into a particular area 8B reduced in size in the width direction, the blocks 81 to 83 do not fit within the particular area 8B, but partially protrude out of the particular area 8B. In this case, the character size of the character string in each of the blocks 81 to 83 is reduced based on the adjustment information 75A and the setting size information 75B in the following manner.

As shown in FIG. 5C, in an attempt to reduce the character size of the character string "BIG" in the block 81, the printer 1 first selects the adjustment method "Width Adjustment" with the highest priority set therefor, and specifies the setting size information "×½" set for the character string "BIG" in the selected method "Width Adjustment." The setting size information "×½" is size information specifying the smallest character size among the plurality of pieces of size information associated with the method "Width Adjustment." In this case, the printer 1 subsequently selects the adjustment method "Big Character" with the second highest priority set therefor, and specifies the setting size information "ON" set for the character string "BIG" in the selected method "Big Character." Here, the method "Big Character" is associated with "OFF" which is size information specifying a character size one-level smaller than "ON." Therefore, the character size of the character string "BIG" in the block 81 is adjusted in accordance with the size information "OFF" associated with the method "Big Character." In this case, the character size of the character string "BIG" is reduced by 20% (i.e., at a reduction rate of 80%) in each of the width direction and the height direction. Further, the setting size information for the character string "BIG" in the method "Big Character" is changed from "ON" to "OFF."

In an attempt to reduce the character size of the character string "Width" in the block 82, the printer 1 first selects the adjustment method "Width Adjustment" with the highest priority set therefor, and specifies the setting size information "×1" set for the character string "Width" in the selected method "Width Adjustment." Here, the method "Width Adjustment" is associated with "×⅔" which is setting information specifying a character size one-level smaller than "×1." Therefore, the character size of the character string "Width" in the block 82 is adjusted in accordance with the size information "×⅔" associated with the method "Width Adjustment." In this case, the character size of the character string "Width" is reduced by 33.3% (i.e., at a reduction rate of 66.7%) in the width direction. It is noted that the character size of the character string "Width" is not reduced in the height direction. Further, the setting size information for the character string "Width" in the method "Width Adjustment" is changed from "×1" to "×⅔."

In an attempt to reduce the character size of the character string "1PDown" in the block 83, the printer 1 first selects the adjustment method "Width Adjustment" with the highest priority set therefor, and specifies the setting size information "×½" set for the character string "1PDown" in the selected method "Width Adjustment." The setting size information "×½" is size information specifying the smallest character size among the plurality of pieces of size information associated with the method "Width Adjustment." In this case, the printer 1 subsequently selects the adjustment method "Big Character" with the second highest priority set therefor, and specifies the setting size information "OFF" set for the character string "Width" in the selected method "Big Character." The setting size information "OFF" is size information specifying the smallest character size among the plurality of pieces of size information associated with the method "Big Character." In this case, the printer 1 further selects the adjustment method "Font Size" with the third highest priority set therefor, and specifies the setting size information "50 pt" set for the character string "Width" in the selected method "Font Size." Here, the method "Font Size" is associated with "45 pt" which is size information specifying a character size one-level smaller than "50 pt." Therefore, the character size of the character string "1PDown" in the block 83 is adjusted in accordance with the size information "45 pt" associated with the method "Font Size." In this case, the character size of the character string "1PDown" is reduced by 10% (i.e., at a reduction rate of 90%) in each of the width direction and the height direction. Further, the setting size information for the character string "1PDown" in the method "Font Size" is changed from "50 pt" to "45 pt."

FIG. 5B shows respective locations of the blocks 81 to 83 when the respective character sizes of the character strings "BIG," "Width," and "1PDown" have been reduced in the aforementioned manner. For instance, in the width direction, a change amount of the block size of the block 82 reduced by 33.3% (i.e., reduced at a reduction rate of 66.7%) is larger than a change amount of the block size of the block 83 reduced by 10% (i.e., reduced at a reduction rate of 90%). Therefore, positions of respective tail ends of the blocks 82 and 83 in the width direction are quite different from each other. Thus, the respective change amounts of the block sizes of the blocks 81 to 83 are different from each other, due to differences among the respective reduction rates for reducing the block sizes of the blocks 81 to 83. Hence, a layout balance, in the width direction, of the blocks 81 to 83 disposed within the particular area 8B varies from that of the blocks 81 to 83 disposed within the particular area 8A. For this reason, in the heretofore-applied method, when each character string is reduced in size to fit within the reduced particular area 8B, the blocks 81 to 83 might be disposed in the particular area 8B with a layout different from a user's intended one.

<New Method for Reducing Character Size when Particular Area is Changed>

Meanwhile, in the illustrative embodiment, to maintain the layout balance of the blocks 81 to 83 disposed within the particular area 8B, the printer 1 may reduce the character size of each character string based on the adjustment information 75A and the setting size information 75B in the following manner.

First, for each of the blocks 81 to 83, the CPU 71 of the printer 1 calculates a reduction rate in the width direction at which the character size is reduced when setting size information for the corresponding character string in an adjustment method having the highest priority among adjustment methods available for further reducing the character size is changed to size information specifying a one-level smaller character size. For instance, with respect to the character string "Width" in the block 82, the CPU 71 calculates "66.7%" as a reduction rate in the width direction at which the character size is reduced when the setting size information "×1" in the adjustment method "Width Adjustment" having the highest priority is changed to the size information "×⅔" specifying a character size one-level smaller than "×1." Further, for instance, with respect to the character string "BIG" in the block 81, the adjustment method "Width Adjustment" having the highest priority is not available for further reducing the character size. Therefore, the CPU 71 calculates "80%" as a reduction rate in the width direction at which the character size is reduced when the setting size information "ON" in the adjustment method "Big Character" having the second highest priority is changed to the size information "OFF" specifying a character size one-level smaller than "ON." Further, for instance, with respect to the character string "1PDown" in the block 83, the adjustment method "Width Adjustment" having the highest priority and the adjustment method "Big Character" having the second highest priority are unavailable for further reducing the character size. Therefore, the CPU 71 calculates "90%" as a reduction rate in the width direction at which the character size is reduced when the setting size information "50 pt" in the adjustment method "Font Size" having the third highest priority is changed to the size information "45 pt" specifying a character size one-level smaller than "50 pt."

Subsequently, the CPU 71 identifies the smallest one of the respective reduction rates determined for the blocks 81 to 83 in the aforementioned manner. Hereinafter, the identified reduction rate may be referred to as a "reference reduction rate." Further, an adjustment method for reducing the character size at the reference reduction rate may be referred to as a "reference adjustment method." In the foregoing case, the reduction rate "66.7%" determined for the character string "Width" in the block 82 is identified as the reference reduction rate. Further, the adjustment method "Width Adjustment" is regarded as the reference adjustment method.

Next, the CPU 71 adjusts the character size of the character string in each of the blocks 81 to 83 so as to make a reduction rate for the character size equal or approximated to the identified reference reduction rate "66.7%." Here, with respect to the character string "Width" for which the calculated reduction rate "66.7%" is identified as the reference reduction rate, the CPU 71 reduces the character size of the character string by changing the setting size information "×1" in the reference adjustment method "Width Adjustment" to the size information "×⅔" specifying a character size one-level smaller than "×1." In this case, the reduction rate for the character size of the character string "Width" is equal to the reference reduction rate "66.7%."

Meanwhile, for instance, with respect to the character string "BIG" in the block 81, the CPU 71 changes, to the size information "OFF," the setting size information "ON" for the character string in the adjustment method "Big Character" having the highest priority among adjustment methods available for further reducing the character size, thereby reducing the character string. In this case, the reduction rate for the character size in the width direction is 80%. The CPU 71 attempts to further reduce the character size of the character string "BIG" in the adjustment method "Big Character." However, in the adjustment method "Big Character," since "OFF" is size information for adjusting the character size to be the smallest, there is no size information available for further reducing the character size. Therefore, the CPU 71 attempts to further reduce the character size of the character string "BIG" in the adjustment method "Font Size" having the next highest priority after the method "Big Character," by changing the setting size information "64 pt" to such size information as to make a total reduction rate for the character size equal or approximated to the reference reduction rate "66.7%."

Among the plurality of pieces of size information associated with the adjustment method "Font Size," "56 pt" is size information specifying a character size one-level smaller than "64 pt." In the adjustment method "Font Size," the setting size information is changed from "64 pt" to "56 pt," the character size is reduced by 12.5%. Hence, the CPU 71 changes the setting size information in the adjustment method "Font Size" from "64 pt" to "56 pt," thereby reducing the character size of the character string "BIG." Namely, with respect to the character string "BIG," the CPU 71 changes the setting size information "ON" therefor in the adjustment method "Big Character" to "OFF" which is size information specifying a character size one-level smaller than "ON," and thereafter further reduces the character size thereof by 12.5% in the adjustment method "Font Size." In this case, the total reduction rate for the character size in the width direction is 70%, which is considered approximated to the reference reduction rate "66.7%."

Further, for instance, with respect to the character string "1PDown" in the block 83, the CPU 71 changes, to the size information "45 pt," the setting size information "50 pt" for the character string in the adjustment method "Font Size" having the highest priority among adjustment method(s) available for further reducing the character size, thereby reducing the character string. In this case, the reduction rate for the character size in the width direction is 90%. The CPU 71 attempts to further reduce the character size of the character string "1PDown" by changing the setting size information for the character string in the adjustment method "Font Size" to size information specifying a character size one-level smaller than "45 pt." Thus, the CPU 71 reduces the character size of the character string "1PDown" step by step, by repeatedly changing the setting size information for the character string in the adjustment method "Font Size" to another piece of size information until the reduction rate for the character size becomes equal to or approximated to the reference reduction rate "66.7%." Namely, in this case, the character size of the character string "1PDown" is reduced to a character size two or more levels smaller in the adjustment method "Font Size." For instance, the CPU 71 may terminate the foregoing process when the total reduction rate for the character size in the width direction becomes equal to or less than 70%, which is considered approximated to the reference reduction rate "66.7%."

As described above, the CPU 71 adjusts the character size of the character string in each block in such a manner as to make the reduction rate for the character size equal or approximated to the reference reduction rate "66.7%." Thereby, it is possible to fit the blocks 81 to 83 within the particular area 8B reduced in size and maintain the layout balance of the blocks 81 to 83 disposed within the particular area 8B.

<Main Process>

Referring to FIGS. 7 to 10, a main process to be executed by the CPU 71 of the printer 1 will be described. In response to accepting, via the keyboard 3, a user operation to convert the particular area 8A (see FIGS. 5A-5B and 6A-6B) into the particular area 8B (see FIGS. 5A-5B and 6A-6B) reduced in size, the CPU 71 may execute one or more programs 70A stored in the ROM 72 or the flash memory 75, thereby launching the main process. Hereinafter, a specific explanation will be provided under an assumption that the particular area 8A within which the blocks 81 to 83 are disposed is converted to the particular area 8B reduced in size, as shown in FIGS. 5A-5B and 6A-6B. It is noted that, in the following description, a "reduction rate" in general, and unless specified otherwise, may represent a reduction rate for the character size in the width direction.

As shown in FIG. 7, the CPU 71 determines the block size of each of the blocks 81 to 83 disposed within the particular area 8A that is not reduced in size (S11). It is noted that the block size of each of the blocks 81 to 83 may be determined by identifying the character size of the character string in each of the blocks 81 to 83 based on the adjustment information 75A and the setting size information 75B. Hereinafter, the character strings in the blocks 81, 82, and 83 may be referred to as a "first character string," a "second character string," and a "third character string," respectively.

Subsequently, the CPU 71 determines whether it is possible to dispose (fit) the blocks 81 to 83 within the particular area 8B reduced in size, based on the determined block sizes of the blocks 81 to 83 and the locations of the blocks 81 to 83 (S13). When determining that it is possible to dispose the blocks 81 to 83 within the particular area 8B reduced in size (S13: Yes), the CPU 71 terminates the main process. Meanwhile, when determining that it is not possible to dispose the blocks 81 to 83 within the particular area 8B reduced in size (S13: No), the CPU 71 performs an adjustment process (see FIG. 8) to adjust the character size of the character string in each of the blocks 81 to 83 (S15).

The adjustment process will be described with reference to FIG. 8. The CPU 71 puts an initial value "1" into a variable "n" stored in the RAM 74, thereby initializing the variable "n" (S31). The variable "n" is used to sequentially select one of the first to third character strings respectively set in the blocks 81 to 83. For instance, when the initial value "1" is put into the variable "n," the CPU 71 performs a determination process (see FIG. 9) to determine the reference reduction rate and the reference adjustment method based on the first character string (S33).

The determination process will be described with reference to FIG. 9. The CPU 71 determines whether it is possible to adjust the character size of the n-th character string in the adjustment method "Width Adjustment," based on whether it is possible to change the setting size information to size information specifying a one-level smaller character size (S51). When the setting size information for the n-th character string in the method "Width Adjustment" is not size information specifying the smallest character size among the plurality of pieces of size information associated with the method "Width Adjustment," the CPU 71 determines that it is possible to adjust the character size of the n-th character string in the method "Width Adjustment" (S51: Yes). In this case, the CPU 71 sets "Width Adjustment" as an n-th adjustment method stored in the RAM 74. Further, the CPU 71 sets, as an n-th reduction rate stored in the RAM 74, a reduction rate at which the character size of the n-th character string is reduced when the setting size information for the n-th character string in the n-th adjustment method is changed to size information specifying a one-level smaller character size (S53). It is noted that the n-th adjustment method represents an adjustment method having the highest priority among adjustment methods available for further reducing the character size of the n-th character string in the adjustment information 75A. After S53, the CPU 71 goes to S65.

Meanwhile, when the setting size information for the n-th character string in the adjustment method "Width Adjustment" is size information specifying the smallest character size among the plurality of pieces of size information associated with the method "Width Adjustment," the CPU 71 determines that it is impossible to adjust the character size of the n-th character string in the method "Width Adjustment" (SM: No). In this case, the CPU 71 goes to S55, in which the CPU 71 performs substantially the same process as executed in SM, with respect to the adjustment method "Big Character" having the next highest priority after the method "Width Adjustment."

Specifically, the CPU 71 determines whether it is possible to adjust the character size of the n-th character string in the adjustment method "Big Character," based on whether it is possible to change the setting size information to size information specifying a one-level smaller character size (S55). When the setting size information for the n-th character string in the method "Big Character" is not size information specifying the smallest character size among the plurality of pieces of size information associated with the method "Big Character" (i.e., when the setting size information is "ON"), the CPU 71 determines that it is possible to adjust the character size of the n-th character string in the method "Big Character" (S55: Yes). In this case, the CPU 71 sets "Big Character" as the n-th adjustment method. Further, the CPU 71 sets "80%" (see FIG. 4C) as the n-th reduction rate (S57). Afterward, the CPU 71 goes to S65. Meanwhile, when the setting size information for the n-th character string in the method "Big Character" is size information specifying the smallest character size among the plurality of pieces of size information associated with the method "Big Character" (i.e., when the setting size information is "OFF"), the CPU 71 determines that it is impossible to adjust the character size of the n-th character string in the method "Big Character" (S55: No). In this case, the CPU 71 goes to S59, in which the CPU 71 performs substantially the same process as executed in SM or S55, with respect to the adjustment method "Font Size" having the next highest priority after the method "Big Character."

Specifically, the CPU 71 determines whether it is possible to adjust the character size of the n-th character string in the adjustment method "Font Size," based on whether it is possible to change the setting size information to size information specifying a one-level smaller character size (S59). When the setting size information for the n-th character string in the method "Font Size" is not size information specifying the smallest character size among the plurality of pieces of size information associated with the method "Font Size," the CPU 71 determines that it is possible to adjust the character size of the n-th character string in the method "Font Size" (S59: Yes). In this case, the CPU 71 sets "Font Size" as the n-th adjustment method. Further, the CPU 71 sets, as the n-th reduction rate, a reduction rate in the width direction at which the character size of the n-th character string is reduced when the setting size information for the n-th character string in the n-th adjustment method is changed to size information specifying a one-level smaller character size (S61). Afterward, the CPU 71 goes to S65. Meanwhile, when the setting size information for the n-th character string in the method "Font Size" is size information specifying the smallest character size among the plurality of pieces of size information associated with the method "Font Size," the CPU 71 determines that it is impossible to adjust the character size of the n-th character string in the method "Font Size" (S59: No). In this case, it is impossible to adjust the character size in any of the adjustment methods "Width Adjustment," "Big Character," and "Font Size." The CPU 71 sets "Impossible To Adjust" as the n-th adjustment method (S63). The CPU 71 goes to S65.

The CPU 71 determines whether the n-th reduction rate is the smallest among the first to n-th reduction rates (S65). When determining that the n-th reduction rate is the smallest among the first to n-th reduction rates (S65: Yes), the CPU 71 sets the n-th adjustment method as the reference adjustment method (S67). The CPU 71 sets the n-th reduction rate as the reference adjustment method (S69). The CPU 71 terminates the determination process and returns to the adjustment process (see FIG. 8). Meanwhile, when determining that one of the first to (n−1)-th reduction rates is smaller than the n-th reduction rate or that "Impossible To Adjust" is set as the n-th adjustment method (S65: No), the CPU 71 terminates the determination process without setting the n-th adjustment method as the reference adjustment method or setting the n-th reduction rate as the reference reduction rate, and returns to the adjustment process (see FIG. 8).

As shown in FIG. 8, after completion of the determination process (S33), the CPU 71 determines whether a total number of the character strings (i.e., the first to third character strings) included in the particular area 8B is equal to or less than "n" (S35). When determining that the total number of the character strings included in the particular area 8B is more than "n" (S35: No), the CPU 71 goes to S39. The CPU 71 updates the variable "n" by incrementing "n" by one (S39). The CPU 71 goes back to S33. The CPU 71 repeatedly performs the determination process (S33) for the n-th character string corresponding to the updated variable "n." When determining that the total number of the character strings included in the particular area 8B is equal to or less than "n" (S35: Yes), the CPU 71 goes to S37. Thus, the CPU 71 performs the determination process for each of the first to third character strings, thereby identifying the reference adjustment method and the reference reduction rate.

The CPU 71 puts the value "1" into the variable "n," thereby initializing the variable "n" (S37). Based on the reference adjustment method and the reference reduction rate identified in the determination process, the CPU 71 performs a changing process (see FIG. 10) to change the character size of each of the first to third character strings (S41).

The changing process will be described with reference to FIG. 10. The CPU 71 determines whether "Impossible To Adjust" is set as the n-th adjustment method for the n-th character string (S81). It is noted that, when "Impossible To Adjust" is set as the n-th adjustment method, it is impossible to adjust the character size of the n-th character string. Therefore, when determining that "Impossible To Adjust" is set as the n-th adjustment method for the n-th character string (S81: Yes), the CPU 71 terminates the changing process and returns to the adjustment process (see FIG. 8). Meanwhile, when determining that "Impossible To Adjust" is not set as the n-th adjustment method for the n-th character string (S81: No), the CPU 71 goes to S83.

The CPU 71 determines whether "Width Adjustment" is set as the reference adjustment method (S83). For instance, in an example shown in FIGS. 6A to 6C, the second reduction rate "66.7%" for the character size of the second character string "Width" is identified as the reference reduction rate. In this case, the second adjustment method "Width Adjustment" is identified as the reference adjustment method. When determining that "Width Adjustment" is set as the reference adjustment method (S83: Yes), the CPU 71 determines whether "Width Adjustment" is set as the n-th adjustment method (S95). When determining that "Width Adjustment" is set as the n-th adjustment method (S95: Yes), the CPU 71 reduces the character size of the n-th character string to a character size according to size information one-level smaller than the setting size information among the plurality of pieces of size information associated with the adjustment method "Width Adjustment" (S97). In the example shown in FIGS. 6A to 6C, the reduction rate for reducing the character size of the second character string "Width" to a one-level smaller character size in the second adjustment method "Width Adjustment" is "66.7%," which is equal to the reference reduction rate. After completion of S97, the CPU 71 terminates the changing process and returns to the adjustment process (see FIG. 8).

When determining that "Width Adjustment" is not set as the n-th adjustment method (S95: No), the CPU 71 determines whether "Big Character" is set as the n-th adjustment method (S99). When determining that "Big Character" is set as the n-th adjustment method (S99: Yes), the CPU 71 reduces the character size of the n-th character string to a character size when the setting size information "ON" is changed to the size information "OFF" one-level smaller than "ON" (S101). It is noted that the reduction rate at which the character size is reduced when the setting size information "ON" in the adjustment method "Big Character" is changed to the size information "OFF" specifying a character size one-level smaller than "ON" is always "80%" (see FIG. 4C).

Subsequently, in the adjustment method "Font Size" having the next highest priority after the method "Big Character," the CPU 71 identifies size information for further reducing the character size by such a particular rate as to make a resulting total reduction rate equal or approximated to the reference reduction rate "66.7%." For instance, the CPU 71 may identify size information for reducing, by a particular rate of 12.5%, the character size specified by the setting size information in the adjustment method "Font Size." Then, the CPU 71 further reduces the character size of the n-th character string to a character size specified by the identified size information in the method "Font Size" (S103). It is noted that the character size of the n-th character string has been reduced at the reduction rate "80%" in the method "Big Character" (S101). From this state, the character size of the n-th character string is further reduced by 12.5%. Consequently, the character size of the n-th character string is reduced at a total reduction rate of 70%, which is considered approximated to the reference reduction rate "66.7%." After completion of S103, the CPU 71 terminates the changing process and returns to the adjustment process (see FIG. 8).

When determining that "Big Character" is not set as the n-th adjustment method (S99: No), the CPU 71 determines that "Font Size" is set as the n-th adjustment method. In this case, the CPU 71 selects size information specifying a character size one-level smaller than the setting size information from among the plurality of pieces of size information associated with the method "Font Size." Then, the CPU 71 reduces the character size of the n-th character string based on the selected size information. The CPU 71 repeatedly performs the foregoing operations until the total reduction rate for the character size of the n-th character string becomes equal or approximated to the reference reduction rate "66.7%" (S105). For instance, the CPU 71 may repeatedly perform the foregoing operations until the total reduction rate for the character size becomes equal to or less than 70%, which is considered approximated to the reference reduction rate "66.7%." After completion of S105, the CPU 71 terminates the changing process and returns to the adjustment process (see FIG. 8).

When determining that "Width Adjustment" is not set as the reference adjustment method (S83: No), the CPU 71 determines whether "Big Character" is set as the reference adjustment method (S85). It is noted that, when "Big Character" is set as the reference adjustment method, "80%" is set as the reference reduction rate (see S57 in FIG. 9). When determining that "Big Character" is set as the reference adjustment method (S85: Yes), the CPU 71 determines whether "Big Character" is set as the n-th adjustment method (S89). When determining that "Big Character" is set as the n-th adjustment method (S89: Yes), the CPU 71 reduces the character size of the n-th character string by changing the setting size information "ON" for the n-th character string in the method "Big Character" to the size information "OFF" specifying a character size one-level smaller than "ON" (S91). It is noted that, when the setting size information in the adjustment method "Big Character" is changed to size information specifying a one-level smaller character size, the reduction rate for the character size is always "80%" (see FIG. 4C). Therefore, the reduction rate for the character size of the n-th character string is equal to the reference reduction rate. After completion of S91, the CPU 71 terminates the changing process and returns to the adjustment process (see FIG. 8).

When determining that "Big Character" is not set as the n-th adjustment method (S89: No), the CPU 71 determines that "Font Size" is set as the n-th adjustment method. In this case, the CPU 71 selects size information specifying a character size one-level smaller than the setting size information from among the plurality of pieces of size information associated with the method "Font Size." Then, the CPU 71 reduces the character size of the n-th character string based on the selected size information. The CPU 71 repeatedly performs the foregoing operations until the total reduction rate for the character size of the n-th character string becomes equal or approximated to the reference reduction rate "80%" (S93). After completion of S93, the CPU 71 terminates the changing process and returns to the adjustment process (see FIG. 8).

When determining that "Big Character" is not set as the reference adjustment method (S85: No), the CPU 71 determines that "Font Size" is set as the reference adjustment method. It is noted that, when "Font Size" is set as the reference adjustment method, an arbitrary reduction rate is set as the reference reduction rate (see S61 in FIG. 9). In this case, the CPU 71 selects size information specifying a character size one-level smaller than the setting size information from among the plurality of pieces of size information associated with the method "Font Size." Then, the CPU 71 reduces the character size of the n-th character string based on the selected size information. The CPU 71 repeatedly performs the foregoing operations until the total reduction rate for the character size of the n-th character string becomes equal or approximated to the reference reduction rate (S87). After completion of S87, the CPU 71 terminates the changing process and returns to the adjustment process (see FIG. 8).

As shown in FIG. 8, after completion of the changing process (S41), the CPU 71 determines whether the total number of the character strings (i.e., the first to third character strings) included in the particular area 8B is equal to or less than "n" (S43). When determining that the total number of the character strings included in the particular area 8B is more than "n" (S43: No), the CPU 71 goes to S45. The CPU 71 updates the variable "n" by incrementing "n" by one (S45). The CPU 71 goes back to S41. The CPU 71 repeatedly performs the changing process (S41) for the n-th character string corresponding to the updated variable "n." When determining that the total number of the character strings included in the particular area 8B is equal to or less than "n" (S43: Yes), the CPU 71 determines that the respective character sizes of all the first to third character strings have been reduced, terminates the adjustment process, and returns to the main process (see FIG. 7).

As shown in FIG. 7, after completion of the adjustment process (S15), the CPU 71 determines whether the character sizes of the character strings have been adjusted in the adjustment process (S17). When determining that the character sizes of the character strings have not been adjusted in the adjustment process (S17: No), the CPU 71 controls the display 5 to display error information representing that it is impossible to dispose the blocks 81 to 83 within the particular area 8B (S19). Thereafter, the CPU 71 terminates the main process.

Meanwhile, when determining that the character sizes of the character strings have been adjusted in the adjustment process (S17: Yes), the CPU 71 goes back to S11. The CPU 71 determines the block size of each of the blocks 81 to 83 disposed within the particular area 8A reduced in size after the character size of each character string has been adjusted (S11). The CPU 71 again determines whether it is possible to dispose (fit) the blocks 81 to 83 within the particular area 8B reduced in size, based on the determined block sizes of the blocks 81 to 83 and the locations of the blocks 81 to 83 (S13). When determining that it is possible to dispose the blocks 81 to 83 within the particular area 8B reduced in size (S13: Yes), the CPU 71 terminates the main process. Meanwhile, when determining that it is not possible to dispose the blocks 81 to 83 within the particular area 8B reduced in size (S13: No), the CPU 71 repeatedly performs the steps S11, S15, and S17 until it becomes possible to fit the blocks 81 to 83 within the particular area 8B reduced in size.

Operations and Advantageous Effects of Illustrative Embodiment

To reduce each of the blocks 81 to 83 in size, the printer 1 changes the character size of the character string in each of the blocks 81 to 83 (see FIG. 10). The printer 1 determines, for each of the blocks 81 to 83, a reduction rate for reducing the character size of the character string in each block to a one-level smaller size, based on the adjustment information 75A for each block (S51 to S63). Further, the printer 1 identifies, as a reference reduction rate, the smallest one of the respective reduction rates determined for the blocks 81 to 83 (S69). Then, the printer 1 changes the character size of the character string in each of the blocks 81 to 83 so as to make a reduction rate for the character size equal or approximated to the identified reference reduction rate (see FIG. 10). In this case, the printer 1 may reduce a whole set of the blocks 81 to 83 in size by reducing the block size of each of the blocks 81 to 83 while maintaining a balance of the character sizes of the character strings in the blocks 81 to 83.

For instance, when the reference reduction rate is 66.7%, the printer 1 reduces the character size of the character string "BIG" by changing the setting size information "ON" for the character string in the adjustment method "Big Character" to "OFF" (S101) and changing the setting size information for the character string in the adjustment method "Font Size" having the next highest priority after the method "Big Character" to further reduce the character size by 12.5% (S103). In this case, the total reduction rate for the character size in the width direction is 70%, which is considered approximated to the reference reduction rate "66.7%." Thus, the printer 1 may complement an insufficient reduction rate for reducing the character size to a one-level smaller size in the adjustment method "BIG," by further reducing the character size by a particular rate in the adjustment method "Font Size." Accordingly, for each of the blocks 81 to 83, the printer 1 may reduce the character size to a one-level smaller size in a particular adjustment method and further reduce the character size as needed to accurately make the total reduction rate for the character string equal or approximated to the reference reduction rate.

When adjusting the character size of a character string in the adjustment method "Font Size," the printer 1 may change the setting size information for the character string in the method "Font Size" to size information specifying a character size two or more levels smaller than the setting size information, thereby approximating the reduction rate to the reference reduction rate. In this case, the printer 1 may accurately make the reduction rate for the character size of the character string in each of the blocks 81 to 83 equal or approximated to the reference reduction rate, by changing the setting size information for each character string in the method "Font Size" to size information specifying a character size two or more levels smaller than the setting size information.

The printer 1 may adjust the character size of the character string in each block in any of the adjustment methods "Width Adjustment," "Big Character," and "Font Size." In the method "Width Adjustment," the character size of a character string is adjusted by changing the width of the character string. In the method "Big Character," the character size of a character string is adjusted by changing the width and the height of the character string in such a manner that the character string occupies a particular range. In the method "Font Size," the character size of a character string is adjusted by changing the font size of the character string. Thus, in this case, the printer 1 may reduce the character size of the character string in each of the blocks 81 to 83 in various adjustment methods while maintaining the balance of the character sizes of the character strings in the blocks 81 to 83.

Different priorities are previously set for the three adjustment methods "Width Adjustment," "Big Character," and "Font Size" defined in the adjustment information 75A, respectively. Specifically, the method "Width Adjustment" has a higher priority than the method "Big Character." Further, the method "Big Character" has a higher priority than the method "Font Size." In this case, based on the plurality of pieces of size information associated with each of the three adjustment methods "Width Adjustment," "Big Character," and "Font Size," the printer 1 may gradually reduce the character size of a character string as needed by changing the setting size information for the character string in each adjustment method, sequentially selected from among the three adjustment methods in descending order of the priorities, to size information specifying a one-level smaller character size.

The printer 1 determines the block size of each of the blocks 81 to 83 based on the adjustment information 75A and the setting size information 75B (S11). The printer 1 determines whether it is possible to dispose (fit) the blocks 81 to 83 within the particular area 8B, based on the determined block sizes of the blocks 81 to 83 (S13). When determining that it is not possible to dispose the blocks 81 to 83 within the particular area 8B (S13: No), the printer 1 performs the adjustment process (S15), thereby adjusting the character size of the character string in each of the blocks 81 to 83. In this case, the printer 1 may dispose the blocks 81 to 83 within the particular area 8B by reducing the block size of each of the blocks 81 to 83, while maintaining the balance of the character sizes of the character strings in the blocks 81 to 83.

In each of the adjustment methods "Big Character" and "Font Size," when corresponding setting size information is changed to size information specifying a one-level smaller character size, the character size is reduced in both the width direction and the height direction. In this case, the printer 1 may reduce the whole set of the blocks 81 to 83 in size by reducing the block size of each of the blocks 81 to 83, while maintaining a balance of the character sizes of the character strings in the blocks 81 to 83 in not only the width direction but also the height direction.

The blocks 81 to 83 are separated from each other when the character strings each including a plurality of characters are separated from each other by line feeds. In this case, the printer 1 may reduce the whole set of the blocks 81 to 83 in size by reducing the block size of each of the blocks 81 to 83, while maintaining a balance of a whole layout of the blocks 81 to 83 separated by the line feeds.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

<Modifications>

In the aforementioned illustrative embodiment, the main process is performed by the CPU 71 of the printer 1. Nonetheless, for instance, the main process may be performed by a CPU of the external terminal 29A connected with the printer 1. In this case, the printer 1 may receive programs (substantially equivalent to the programs 70A)

stored in a storage of the external terminal 29A, from a server (not shown) connected with the external terminal 29A.

In the aforementioned illustrative embodiment, each of the blocks 81 to 83 includes a character string having a plurality of characters. Nonetheless, the number of characters included in each block may be one. Further, the adjustment methods defined in the adjustment information 75A may not necessarily be limited to "Width Adjustment," "Big Character," and "Font Size." For instance, an adjustment method for adjusting the character size only in the height direction but not in the width direction may further be defined in the adjustment information 75A. Further, another adjustment method may be defined in the adjustment information 75A. One of the adjustment methods "Width Adjustment," "Big Character," and "Font Size" may be deleted from the adjustment methods defined in the adjustment information 75A. The plurality of pieces of size information associated with each adjustment method may not necessarily be limited to those exemplified in the aforementioned illustrative embodiment. For instance, the plurality of pieces of size information associated with the adjustment method "Width Adjustment" may gradually vary by 30% from one piece to a next piece of size information. Further, the plurality of pieces of size information associated with the adjustment method "Font Size" may gradually vary from one piece to a next piece of size information at regular intervals of a single point.

In the aforementioned illustrative embodiment, when the reference reduction rate is "66.7%," the CPU 71 changes the setting size information "ON" for the character string "BIG" in the adjustment method "Big Character" to "OFF," thereby reducing the character size of the character string (S101). Further, the CPU 71 changes the setting size information "64 pt" for the character string in the adjustment method "Font Size" having the next highest priority after the method "Big Character" to such size information (e.g., size information specifying a character size 12.5% smaller than "64 pt") as to make the total reduction rate equal or approximated to the reference reduction rate "66.7%" (S103). Here, in order to reduce the character size of the character string "BIG" by 12.5%, as exemplified in FIGS. 6A to 6C, the CPU 71 may change the setting size information "64 pt" for the character string "BIG" in the method "Font Size" to size information specifying a character size smaller than "64 pt" in the adjustment information 75A. Further, for instance, the CPU 71 may calculate a font size for reducing the character size of the character string "BIG" by 12.5%, and may reduce the character size in accordance with the calculated font size. In this case, the calculated font size to be applied may not necessarily be one of the plurality of pieces of size information associated with the method "Font Size" in the adjustment information 75A.

As exemplified in the aforementioned illustrative embodiment, the CPU 71 may reduce the character size of a character string in the adjustment method "Font Size" so as to make the reduction rate equal or approximated to the reference reduction rate by changing the setting size information for the character string to size information specifying a character size two or more levels smaller than the setting size information. Nonetheless, the CPU 71 may calculate a font size for reducing the character size of the character string so as to make the reduction rate equal to the reference reduction rate "66.7%," and may reduce the character size in accordance with the calculated font size.

The priorities set for the adjustment methods "Width Adjustment," "Big Character," and "Font Size" are not limited to those exemplified in the aforementioned illustrative embodiment. Further, the priorities may be changed in accordance with user settings.

In the aforementioned illustrative embodiment, when determining that it is not possible to dispose the blocks 81 to 83 within the particular area 8B (S13: No), the CPU 71 performs the adjustment process (S15), thereby adjusting the character size of the character string in each of the blocks 81 to 83. Nonetheless, for instance, when an operation of reducing the whole set of the blocks 81 to 83 is performed, the CPU 71 may performs the adjustment process (S15), thereby adjusting the character size of the character string in each of the blocks 81 to 83.

In the aforementioned illustrative embodiment, when the particular area 8A is reduced in size in the width direction, the CPU 71 performs the main process (see FIG. 7) to fit the blocks 81 to 83 within the particular area 8B reduced in size. However, the particular area 8A may be reduced in size in the height direction. In this case, the blocks 81 to 83 might not be fitted within the particular area 8B in the height direction. In this case, a reference reduction rate may be identified based on reduction rates in the height direction for the character sizes of the character strings in the blocks 81 to 83. The printer 1 may adjust the character size of the character string in each of the blocks 81 to 83 in each adjustment method, so as to make the reduction rate for each character string in the height direction equal or approximated to the identified reference reduction rate. In this case, the printer 1 may reduce the character size of the character string in each of the blocks 81 to 83 in each of the width direction and the height direction. Therefore, the printer 1 may change the character size of the character string in each of the blocks 81 to 83 so as to fit the blocks 81 to 83 within the particular area 8B in both the width direction and the height direction.

In the aforementioned illustrative embodiment, the CPU 71 separates the character strings from each other by line feeds inserted when the line feed button is pressed, thereby separating the blocks 81 to 83 from each other. However, the CPU 71 may accept an instruction to insert a block feed when a cursor is between character strings, thereby separating the blocks 81 to 83 from each other.

Associations between elements exemplified in the aforementioned illustrative embodiments and elements according to aspects of the present disclosure will be exemplified below. The printer 1 may be an example of an "editing device" according to aspects of the present disclosure. The flash memory 75 storing the adjustment information 75A and the setting size information 75B may be an example of a "storage" according to aspects of the present disclosure. The controller 70 may be an example of an "adjuster" according to aspects of the present disclosure. In this case, the CPU 71 may be included in the "adjuster" according to aspects of the present disclosure. Further, the ROM 72 storing the programs 70A may be included in the "adjuster" according to aspects of the present disclosure. The adjustment method "Width Adjustment" may be an example of a "first method" according to aspects of the present disclosure. The adjustment method "Big Character" may be an example of a "second method" according to aspects of the present disclosure. The adjustment method "Font Size" may be an example of a "third method" according to aspects of the present disclosure.

What is claimed is:
1. An editing device comprising:
a memory storing:
adjustment information including a plurality of pieces of size information associated with each of a plurality of adjustment methods for adjusting a character size of one or more characters disposed in each of a plurality of blocks, the plurality of pieces of size information specifying a plurality of gradually-varying character sizes settable for each block in each adjustment method; and setting size information set for each block in each adjustment method, the setting size information being size information specifying the character size set for each block, among the plurality of pieces of size information associated with each adjustment method; and a controller comprising hardware, the controller being configured to:

with respect to a specific one of the adjustment methods for each block, determine, for each block among the plurality of blocks, a first reduction rate at which the character size specified by the setting size information associated with the specific adjustment method is reduced when the setting size information is changed to size information specifying a character size one-level smaller than the setting size information, among the plurality of pieces of size information associated with the specific adjustment method for each block in the adjustment information;

identify, as a reference reduction rate, a smallest one of the determined first reduction rates for the plurality of blocks, wherein the identified reference reduction rate corresponds to a particular block among the plurality of blocks; and adjust, for one or more blocks other than the particular block, the character size of the one or more characters of the one or more blocks with a second reduction rate that is equal or approximated to the identified reference reduction rate, the second reduction rate being smaller than the first reduction rates determined with respect to the specific adjustment method for the one or more blocks.

2. The editing device according to claim 1,
wherein the controller is further configured to:
for each block among the plurality of blocks, reduce the character size specified by the setting size information associated with the specific adjustment method, at the determined first reduction rate, by changing the setting size information to the size information specifying the character size one-level smaller than the setting size information, among the plurality of pieces of size information associated with the specific adjustment method for each block in the adjustment information; and
when it is determined that the determined first reduction rate for at least one block among the plurality of blocks is not equal or approximated to the reference reduction rate, further reduce the reduced character size of the one or more characters in the at least one block by a particular rate.

3. The editing device according to claim 1,
wherein the controller is further configured to:
when it is determined that the determined first reduction rate for at least one block among the plurality of blocks is not equal or approximated to the reference reduction rate, reduce the character size specified by the setting size information associated with a particular one of the adjustment methods for the at least one block, by changing the setting size information to size information specifying a character size two or more levels smaller than the setting size information, among the plurality of pieces of size information associated with the particular adjustment method for the at least one block in the adjustment information.

4. The editing device according to claim 1,
wherein the plurality of adjustment methods include at least one of:
a first method for adjusting the character size of the one or more characters in a target one of the blocks by adjusting a width of the one or more characters in the target block;
a second method for adjusting the character size of the one or more characters in the target block by adjusting the width and a height of the one or more characters in the target block in such a manner that the one or more characters in the target block occupy a particular range;
a third method for adjusting the character size of the one or more characters in the target block by adjusting a font size of the one or more characters in the target block; and
a fourth method for adjusting the character size of the one or more characters in the target block by adjusting the height of the one or more characters in the target block.

5. The editing device according to claim 4,
wherein the plurality of adjustment methods include at least two of the first method, the second method, and the third method,
wherein the first method has a higher priority than the second method, and the second method has a higher priority than the third method, and
wherein the controller is further configured to:
sequentially select one of the plurality of adjustment methods in order of the priorities, for each of the blocks;
when the setting size information associated with an earlier-selected one of the adjustment methods for the target block is size information specifying a smallest character size among the plurality of pieces of size information associated with the earlier-selected adjustment method, subsequently select an adjustment method having a next highest priority after the earlier-selected adjustment method;
when the setting size information associated with the subsequently-selected adjustment method for the target block is not size information specifying a smallest character size among the plurality of pieces of size information associated with the subsequently-selected adjustment method, determine the subsequently-selected adjustment method as the specific adjustment method for the target block; and
determine a reduction rate at which the character size for the target block is reduced when the setting size information associated with the determined specific adjustment method for the target block is changed to the size information specifying the character size one-level smaller than the setting size information, among the plurality of pieces of size information associated with the specific adjustment method for the target block in the adjustment information.

6. The editing device according to claim 1,
wherein the controller is further configured to:
before adjusting the character size of the one or more characters of the one or more blocks, determine a block size of each block, based on the character size for each block that is specified by the setting size information associated with each adjustment method for each block;

determine whether it is possible to dispose the plurality of blocks within a particular area, based on the determined block size of each block; and in response to determining that it is not possible to dispose the plurality of blocks within the particular area, adjust the character size of the one or more characters in each block.

7. The editing device according to claim 1, wherein at least one of the adjustment methods is configured to, when the setting size information for a target block among the plurality of blocks in the at least one adjustment method is changed to size information specifying a character size one-level smaller than the setting size information among the plurality of pieces of size information associated with the at least one adjustment method in the adjustment information, reduce the character size of the one or more characters in the target block in both a width direction and a height direction of the one or more characters.

8. The editing device according to claim 1, wherein each block of the plurality of blocks includes a character string disposed therein, the character string including a plurality of characters, and wherein the plurality of blocks are formed as the character strings are separated from each other by a line feed or a block feed inserted therebetween.

9. The editing device according to claim 1, wherein the memory is a first memory, and the controller comprises:

a processor; and a second memory storing processor-executable instructions configured to, when executed by the processor, cause the processor to:

with respect to the specific adjustment method for each block, determine the first reduction rate at which the character size specified by the setting size information associated with the specific adjustment method is reduced when the setting size information is changed to the size information specifying the character size one-level smaller than the setting size information, among the plurality of pieces of size information associated with the specific adjustment method for each block in the adjustment information;

identify, as the reference reduction rate, the smallest one of the determined first reduction rates; and adjust the character size of the one or more characters in each block with the second reduction rate that is equal or approximated to the identified reference reduction rate.

10. A method implementable on a processor coupled with an editing device, the editing device comprising a storage storing:

adjustment information including a plurality of pieces of size information associated with each of a plurality of adjustment methods for adjusting a character size of one or more characters disposed in each of a plurality of blocks, the plurality of pieces of size information specifying a plurality of gradually-varying character sizes settable for each block in each adjustment method; and setting size information set for each block in each adjustment method, the setting size information being size information specifying the character size set for each block, among the plurality of pieces of size information associated with each adjustment method, the method comprising:

with respect to a specific one of the adjustment methods for each block, for each block among the plurality of blocks, determining a first reduction rate at which the character size specified by the setting size information associated with the specific adjustment method is reduced when the setting size information is changed to size information specifying a character size one-level smaller than the setting size information, among the plurality of pieces of size information associated with the specific adjustment method for each block in the adjustment information;

identifying, as a reference reduction rate, a smallest one of the determined first reduction rates for the plurality of blocks, wherein the identified reference reduction rate corresponds to a particular block among the plurality of blocks; and adjusting, for one or more blocks other than the particular block, the character size of the one or more characters of the one or more blocks with a second reduction rate that is equal or approximated to the identified reference reduction rate, the second reduction rate being smaller than the first reduction rates determined with respect to the specific adjustment method for the one or more blocks.

11. A non-transitory computer-readable medium storing computer-readable instructions that are executable by a processor coupled with an editing device, the editing device comprising a storage storing:

adjustment information including a plurality of pieces of size information associated with each of a plurality of adjustment methods for adjusting a character size of one or more characters disposed in each of a plurality of blocks, the plurality of pieces of size information specifying a plurality of gradually-varying character sizes settable for each block in each adjustment method; and setting size information set for each block in each adjustment method, the setting size information being size information specifying the character size set for each block, among the plurality of pieces of size information associated with each adjustment method, the instructions being configured to, when executed by the processor, cause the processor to:

with respect to a specific one of the adjustment methods for each block, determine, for each block among the plurality of blocks, a first reduction rate at which the character size specified by the setting size information associated with the specific adjustment method is reduced when the setting size information is changed to size information specifying a character size one-level smaller than the setting size information, among the plurality of pieces of size information associated with the specific adjustment method for each block in the adjustment information;

identify, as a reference reduction rate, a smallest one of the determined first reduction rates for the plurality of blocks, wherein the identified reference reduction rate corresponds to a particular block among the plurality of blocks; and adjust, for one or more blocks other than the particular block, the character size of the one or more characters of the one or more blocks with a second reduction rate that is equal or approximated to the identified reference reduction rate, the second reduction rate being smaller than the first reduction rates determined with respect to the specific adjustment method for the one or more blocks.

12. An editing device comprising:

a memory storing:

adjustment information including a plurality of pieces of size information associated with each of a plurality of adjustment methods for adjusting a character size of one or more characters disposed in each of a plurality of blocks, the plurality of pieces of size information specifying a plurality of gradually-varying character sizes settable for each block in each adjustment method, wherein the plurality of adjustment methods include at least one of:

a first method for adjusting the character size of the one or more characters in a target one of the blocks by adjusting a width of the one or more characters in the target block;

a second method for adjusting the character size of the one or more characters in the target block by adjusting the width and a height of the one or more characters in the target block in such a manner that the one or more characters in the target block occupy a particular range;

a third method for adjusting the character size of the one or more characters in the target block by adjusting a font size of the one or more characters in the target block; and a fourth method for adjusting the character size of the one or more characters in the target block by adjusting the height of the one or more characters in the target block;

setting size information set for each block in each adjustment method, the setting size information being size information specifying the character size set for each block, among the plurality of pieces of size information associated with each adjustment method; and a controller comprising hardware, the controller being configured to:

with respect to a specific one of the adjustment methods for each block, determine a reduction rate at which the character size specified by the setting size information associated with the specific adjustment method is reduced when the setting size information is changed to size information specifying a character size one-level smaller than the setting size information, among the plurality of pieces of size information associated with the specific adjustment method for each block in the adjustment information;

identify, as a reference reduction rate, a smallest one of the determined reduction rates for the character sizes each specified by the setting size information associated with the specific adjustment method for a corresponding one of the blocks; and adjust the character size of the one or more characters in each block with a specific reduction rate that is equal or approximated to the identified reference reduction rate.

13. The editing device according to claim 12, wherein the controller is further configured to:

reduce the character size specified by the setting size information associated with the specific adjustment method for each of the blocks, at the determined reduction rate, by changing the setting size information to the size information specifying the character size one-level smaller than the setting size information, among the plurality of pieces of size information associated with the specific adjustment method for each block in the adjustment information; and when it is determined for at least one of the blocks that the determined reduction rate for the at least one block is not equal or approximated to the reference reduction rate, further reduce the reduced character size of the one or more characters in the at least one block by a particular rate.

14. The editing device according to claim 12, wherein the controller is further configured to:

when it is determined for at least one of the blocks that the determined reduction rate for the at least one block is not equal or approximated to the reference reduction rate, reduce the character size specified by the setting size information associated with a particular one of the adjustment methods for the at least one block, by changing the setting size information to size information specifying a character size two or more levels smaller than the setting size information, among the plurality of pieces of size information associated with the particular adjustment method for the at least one block in the adjustment information.

15. The editing device according to claim 12, wherein the plurality of adjustment methods include at least two of the first method, the second method, and the third method, wherein the first method has a higher priority than the second method, and the second method has a higher priority than the third method, and wherein the controller is further configured to:

sequentially select one of the plurality of adjustment methods in order of the priorities, for each of the blocks;

when the setting size information associated with an earlier-selected one of the adjustment methods for the target block is size information specifying a smallest character size among the plurality of pieces of size information associated with the earlier-selected adjustment method, subsequently select an adjustment method having a next highest priority after the earlier-selected adjustment method;

when the setting size information associated with the subsequently-selected adjustment method for the target block is not size information specifying a smallest character size among the plurality of pieces of size information associated with the subsequently-selected adjustment method, determine the subsequently-selected adjustment method as the specific adjustment method for the target block; and determine a reduction rate at which the character size for the target block is reduced when the setting size information associated with the determined specific adjustment method for the target block is changed to the size information specifying the character size one-level smaller than the setting size information, among the plurality of pieces of size information associated with the specific adjustment method for the target block in the adjustment information.

16. The editing device according to claim 12, wherein the controller is further configured to:

before adjusting the character size of the one or more characters in each of the blocks, determine a block size of each block, based on the character size for each block that is specified by the setting size information associated with each adjustment method for each block;

determine whether it is possible to dispose the plurality of blocks within a particular area, based on the determined block size of each block; and in response to determining that it is not possible to dispose the plurality of blocks within the particular area, adjust the character size of the one or more characters in each block.

17. The editing device according to claim 12, wherein at least one of the adjustment methods is configured to, when the setting size information for a target one of the in the at least one adjustment method is changed to size information specifying a character size one-level smaller than the setting size information among the plurality of pieces of size information associated with the at least one adjustment method in the adjustment information, reduce the character size of the one or more characters in the target block in both a width direction and a height direction of the one or more characters.

18. The editing device according to claim 12, wherein each of the blocks includes a character string disposed therein, the character string including a plurality of characters, and wherein the blocks are formed as the character strings are separated from each other by a line feed or a block feed inserted therebetween.

\* \* \* \* \*